United States Patent
Yu et al.

(10) Patent No.: US 11,843,241 B2
(45) Date of Patent: Dec. 12, 2023

(54) INTELLIGENT SWITCH DEVICE AND POWER GENERATION SYSTEM

(71) Applicant: Sungrow Power Supply Co., Ltd., Hefei (CN)

(72) Inventors: Yanfei Yu, Anhui (CN); Zhifei Zhang, Anhui (CN); Xiaoxun Li, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 242 days.

(21) Appl. No.: 17/396,451

(22) Filed: Aug. 6, 2021

(65) Prior Publication Data

US 2022/0166213 A1 May 26, 2022

(30) Foreign Application Priority Data

Nov. 26, 2020 (CN) .......................... 202011349308.9

(51) Int. Cl.
| | |
|---|---|
| H02J 3/38 | (2006.01) |
| H02H 3/10 | (2006.01) |
| H02H 7/20 | (2006.01) |
| H02H 3/093 | (2006.01) |
| H02J 7/35 | (2006.01) |

(52) U.S. Cl.
CPC .............. *H02H 7/20* (2013.01); *H02H 3/093* (2013.01); *H02H 3/105* (2013.01); *H02J 7/35* (2013.01);
(Continued)

(58) Field of Classification Search
CPC .......... H02J 3/388; H02J 3/381; H02H 3/105; H02H 7/20
See application file for complete search history.

(56) References Cited

U.S. PATENT DOCUMENTS

2015/0244209 A1 * 8/2015 Suehiro ................... H02J 9/061
307/65
2017/0005473 A1 * 1/2017 Somani ................... H02J 3/381
(Continued)

FOREIGN PATENT DOCUMENTS

AT              16740 U1 * 7/2020
CN            1972050 A    5/2007
(Continued)

OTHER PUBLICATIONS

First Office Action for Chinese Application No. 202011349308.9, dated Nov. 16, 2022.
(Continued)

*Primary Examiner* — Sisay G Tiku
(74) *Attorney, Agent, or Firm* — Wolf, Greenfield & Sacks, P.C.

(57) ABSTRACT

An intelligent switch device and a power generation system are provided. The intelligent switch device includes a first power port, a second power port, a switch unit and a control unit. A first end of a switch unit is connected to a first power supply via a first power port, and a second end of the switch unit is connected to a second power supply via a second power port. The control unit is configured to control the switch unit to be turned on for a first time period when the first power supply is in abnormal condition, where the abnormal condition causes the switch unit to be tripped. The first time period is greater than or equal to a time period required for a device to respond to the abnormal condition.

18 Claims, 3 Drawing Sheets

(52) U.S. Cl.
    CPC .............. *H02J 3/381* (2013.01); *H02J 3/388* (2020.01); *H02J 2300/26* (2020.01)

(56) References Cited

U.S. PATENT DOCUMENTS

| | | | |
|---|---|---|---|
| 2018/0048158 A1* | 2/2018 | Somani | H02J 3/381 |
| 2018/0115145 A1 | 4/2018 | Benhamza et al. | |
| 2019/0039163 A1* | 2/2019 | Kawai | B23K 9/124 |
| 2019/0173274 A1* | 6/2019 | Fukae | H01M 10/44 |
| 2019/0237283 A1 | 8/2019 | Pabst et al. | |
| 2019/0258212 A1* | 8/2019 | Morton | H02J 3/32 |
| 2020/0122265 A1* | 4/2020 | Kawai | B23K 9/1062 |
| 2020/0403409 A1* | 12/2020 | Nakamura | H02J 7/35 |
| 2021/0036507 A1 | 2/2021 | Du et al. | |
| 2022/0063414 A1* | 3/2022 | Kim | B60L 1/00 |
| 2023/0072786 A1* | 3/2023 | Morita | B60L 58/10 |

FOREIGN PATENT DOCUMENTS

| | | | | |
|---|---|---|---|---|
| CN | 103354352 A | | 10/2013 | |
| CN | 107534285 A | | 1/2018 | |
| CN | 208789940 U | * | 4/2019 | |
| CN | 109962494 A | | 7/2019 | |
| CN | 110120657 A | | 8/2019 | |
| DE | 102015203367 A1 | * | 8/2015 | ............... H02J 3/32 |
| EP | 4007104 A1 | * | 6/2022 | ............... H02H 1/06 |
| JP | 2006-262617 A | | 9/2006 | |
| WO | WO 2017/004125 A1 | | 1/2017 | |
| WO | WO-2017004125 A1 | * | 1/2017 | ............. H02J 3/381 |
| WO | WO-2018161815 A1 | * | 9/2018 | ............... H02J 3/38 |
| WO | WO-2019154856 A1 | * | 8/2019 | ........... H02H 1/0007 |
| WO | WO-2020068024 A2 | * | 4/2020 | |

OTHER PUBLICATIONS

Office Action for Japanese Application No. 2021-132856, dated Nov. 8, 2022.
Extended European Search Report and European Application No. 21191278.7, dated Feb. 9, 2022.
Yan et al., Research on high voltage ride through of wind turbine based on combination of series impedance divider and parallel high impedance grounding. 2019 IEEE Sustainable Power and Energy Conference (iSPEC) Nov. 21, 2019:63-67.

* cited by examiner

INTELLIGENT SWITCH DEVICE AND POWER GENERATION SYSTEM

The present application claims priority to Chinese Patent Application No. 202011349308.9, titled "INTELLIGENT SWITCH DEVICE AND POWER GENERATION SYSTEM", filed on Nov. 26, 2020 with the China National Intellectual Property Administration, which is incorporated herein by reference in its entirety.

FIELD

The present disclosure relates to the technical field of power electronics, and in particular to an intelligent switch device and a power generation system.

BACKGROUND

In a power generation system including a photovoltaic inverter and an energy storage inverter, the system is capable of power generation when being connected to a power grid, and is also capable of supplying power to a when being disconnected to a power grid. According to the conventional technology, a controllable switch device and a detection device (such as a sensor and a power meter) are arranged at a grid-connection position. A detection signal outputted by the detection device and a switch control signal of the controllable switch device are transmitted to the inverter, so that the inverter detects power condition at the grid-connection position. In a case that the power grid is powered on, the inverter controls the controllable switch device to be turned on and the inverter is connected to the power grid. When the power grid is power off, the inverter controls the controllable switch device to be turned off, and the inverter independently supplies power to a load in the system.

In this solution, power supply to the load in a case of grid fault ride-through, such as low voltage ride-through and in a case of grid islanding and grid-disconnection depends on the detection and control performed by the inverter. However, the controllable switch device arranged at the grid-connection position is tripped rapidly. In this case, there is no sufficient time period for the inverter to perform detection and control, which is difficult to meet time period requirements for the grid fault ride-through and grid islanding isolation in some regions.

SUMMARY

In view of this, an intelligent switch device and a power generation system are provided according to the present disclosure, to power supply to a switch unit during a first time period when a first power supply supplying power to the switch unit is powered off, so that a device timely responds to the power-off of the first power supply, thereby meeting time period requirements for the grid fault ride-through and grid islanding isolation.

An intelligent switch device is provided according to a first aspect of the present disclosure. The intelligent switch device includes a first power port, a second power port, a switch unit and a control unit. A first end of the switch unit is connected to a first power supply via the first power port. A second end of the switch unit is connected to a second power supply via the second power port. The control unit is configured to control the switch unit to remain turned on for a first time period when the first power supply is in abnormal operation, wherein the abnormal operation of the first power supply causes the switch unit to be tripped. The first time period is greater than or equal to a time period required for a device to respond to the abnormal operation.

In an embodiment, the intelligent switch device further includes a delay power supply unit. The delay power supply unit is configured to acquire power transmitted from the first power supply to supply power to the control unit and the switch unit, or supply power to the control unit and the switch unit with a delay when the first power supply is in abnormal operation.

In an embodiment, the delay power supply unit includes a delay power supply circuit, a first power supply circuit and a second power supply circuit. The first power supply circuit is configured to acquire power transmitted from the first power supply to supply power to the delay power supply circuit. The second power supply circuit is configured to acquire power transmitted from the second power supply to supply power to the delay power supply circuit when the first power supply is in abnormal operation. The delay power supply circuit is configured to supply power to the control unit and the switch unit.

In an embodiment, at least one of the first power supply circuit and the second power supply circuit acquires power in an isolation manner.

In an embodiment, the delay power supply unit includes a delay power supply circuit, a first power supply circuit and a power storage device storing power. The first power supply circuit is configured to acquire power transmitted from the first power supply to supply power to the delay power supply circuit. The power storage device is configured to supply stored power to the delay power supply circuit when the first power supply is in abnormal operation. The delay power supply circuit is configured to supply power to the control unit and the switch unit.

In an embodiment, the switch unit is turned off when being powered off. The control unit is further configured to control the switch unit to be turned on or turned off when the switch unit is powered on.

In an embodiment, the intelligent switch device further includes a first detection unit. The first detection unit shares a power supply with the control unit. The first detection unit is configured to detect an electrical parameter of the first power supply and transmit the electrical parameter to the control unit for the control unit to control the switch unit.

In an embodiment, the control unit is configured to control the switch unit to be turned off by: controlling the switch unit to be turned off if it is determined that the electrical parameter indicates that the first power supply is in abnormal operation.

In an embodiment, the abnormal operation includes islanding. A time period for the second power supply to detect the islanding and stop output is less than or equal to the first time period; and/or a time period for the control unit to detect the islanding and control to stop output is less than or equal to the first time period.

In an embodiment, the intelligent switch device further includes a second detection unit. The second detection unit shares a power supply with the control unit. The second detection unit is configured to detect an output parameter of the second power supply and transmit the output parameter to the control unit.

In an embodiment, the control unit is configured to control the switch unit to be turned on by: comparing the electrical parameter of the first power supply with the output parameter of the second power supply to obtain a comparison result; and controlling the switch unit to be turned on in a case that the comparison result indicates that the first power supply and the second power supply are allowed to be connected for operation.

In an embodiment, the electrical parameter includes at least one of a voltage, a current, a frequency, a phase and power.

In an embodiment, the intelligent switch device further includes a first communication unit. The first communication unit is configured to communicate with the second power supply. The control unit communicates with the second power supply via the first communication unit.

In an embodiment, the first communication unit is configured to communicate with the second power supply by: transmitting the received electrical parameter of the first power supply to the second power supply; and receiving a first control signal transmitted by the second power supply, and transmitting the first control signal to the control unit. The control unit is further configured to perform operation in response to the first control signal.

In an embodiment, the first communication unit is configured to communicate with the second power supply by: receiving a second control signal transmitted by the control unit, and transmitting the second control signal to the second power supply. The control unit is further configured to: transmit the second control signal to the first communication unit when an operation state of the switch unit is changed, to control an operation state of the second power supply to match the operation state of the switch unit.

In an embodiment, in a case that the switch unit is controlled to be turned on, the second control signal comprises at least one of starting the second power supply and changing an output mode of the second power supply. In a case that the switch unit is controlled to be turned off, the second control signal comprises at least one of stopping output of the second power supply and changing an output mode of the second power supply.

In an embodiment, the first communication unit performs communication by at least one of wired communication, wireless communication and power line carrier communication.

In an embodiment, the intelligent switch device further includes a second communication unit. The second communication unit is configured to communicate with a host computer.

In an embodiment, a switch in the switch unit is a normally-open switch.

In an embodiment, the abnormal condition includes fault ride-through and islanding. A time period for the second power supply to perform the fault ride-through is less than or equal to the first time period. A time period for the second power supply to perform islanding detection and stop output is less than or equal to the first time period, and/or a time period for the control unit to perform islanding detection and control to stop output is less than or equal to the first time period.

In an embodiment, the control unit is further configured to control the switch unit to be turned off when power through the switch unit is greater than a power threshold.

In an embodiment, the control unit is further configured to control the switch unit to be turned off to disconnect the first power port from the second power port when power transmitted from the first power port to the second power port is greater than a first threshold, or power transmitted from the second power port to the first power port is greater than a second threshold.

In an embodiment, the intelligent switch device further includes a power meter. The power meter is communicatively connected to at least one of the second power supply and a host computer.

In an embodiment, the intelligent switch device further includes a plastic shell.

In an embodiment, an operating handle of the switch unit is arranged outside the plastic shell.

A power generation system is provided according to a second aspect of the present disclosure. The power generation system includes a first power supply, one or more second power supplies and the intelligent switch device according to the first aspect of the present disclosure described above. A first output port of the second power supply and the first power supply are connected to the intelligent switch device.

In an embodiment, in a case that the intelligent switch device includes a first communication unit, the second power supply and the intelligent switch device operate in a master-slave control manner.

In an embodiment, the second power supply is a master and the intelligent switch device is a slave. When abnormal operation is detected, the second power supply transmits a first control signal to the intelligent switch device to control the intelligent switch device to be turned off.

In an embodiment, the intelligent switch device is a master and the second power supply is a slave. When abnormal operation is detected, the intelligent switch device transmits a second control signal to the second power supply to control the second power supply to operate normally or stop operating, wherein the abnormal operation causes the switch unit of the intelligent switch device to be tripped.

In an embodiment, the first power supply is capable of operating in a voltage source output mode. The second power supply is capable of switching between the voltage source output mode and an output mode other than the voltage source output mode.

In an embodiment, in a case that the intelligent switch device is turned on, all second power supplies operate in the output mode other than the voltage source output mode. In a case that the intelligent switch device is turned off, at least one second power supply operates in the voltage source output mode, and other second power supply operates in output mode other than the voltage source output mode.

In an embodiment, a first load is arranged between the first output port of the second power supply and the intelligent switch device.

In an embodiment, a second output port of the second power supply is connected to a second load. A priority of power consumption of the second load is higher than a priority of power consumption of the first load.

In an embodiment, the first power supply is a power grid, and the second power supply includes an energy supply unit and a conversion unit. A direct side of the conversion unit is directly or indirectly connected to the energy supply unit. An alternating current side of the conversion unit serves as the first output port of the second power supply.

In an embodiment, the energy supply unit includes at least one of a storage battery, a fuel cell, a photovoltaic power generation unit and a wind power generation unit.

It can be seen from the above technical solutions, an intelligent switch device is provided according to the present disclosure. In the intelligent switch device, a first end of a switch unit is connected to a first power supply via a first power port, and a second end of the switch unit is connected to a second power supply via a second power port. The control unit is configured to control the switch unit to be turned on for a first time period when the first power supply is in abnormal condition, where the abnormal condition causes the switch unit to be tripped. In addition, the first time period is greater than or equal to a time period required for a device to respond to the abnormal condition. Therefore, the device has sufficient time period to operate corresponding to the abnormal condition, so that the device meets the time period requirements on the abnormal condition of the first power supply, such as the time period requirements on grid fault ride-through and islanding isolation, thereby improving safety of a system provided with the intelligent switch device.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

In order to make objects, technical solutions and advantages of embodiments of the present disclosure clearer, the technical solutions in the embodiments of the present disclosure are described clearly and completely with reference to the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

In the present disclosure, the terms "comprise", "include", or any other variants thereof are intended to be non-exclusive, so that a process, method, article, or device including a series of elements includes not only those elements but also other elements that are not listed, or the elements that are inherent for such process, method, article, or device. Unless expressively limited, the statement "including a . . . " does not exclude the case that other similar elements may exist in the process, method, article or device.

An intelligent switch device is provided according to an embodiment of the present disclosure, to solve the problem in the conventional technology that there is no sufficient time period for the inverter to perform detection and control due to rapid release of the controllable switch device so that time period time period requirements for grid fault ride-through and grid islanding isolation in some regions are not met.

Figure 1:
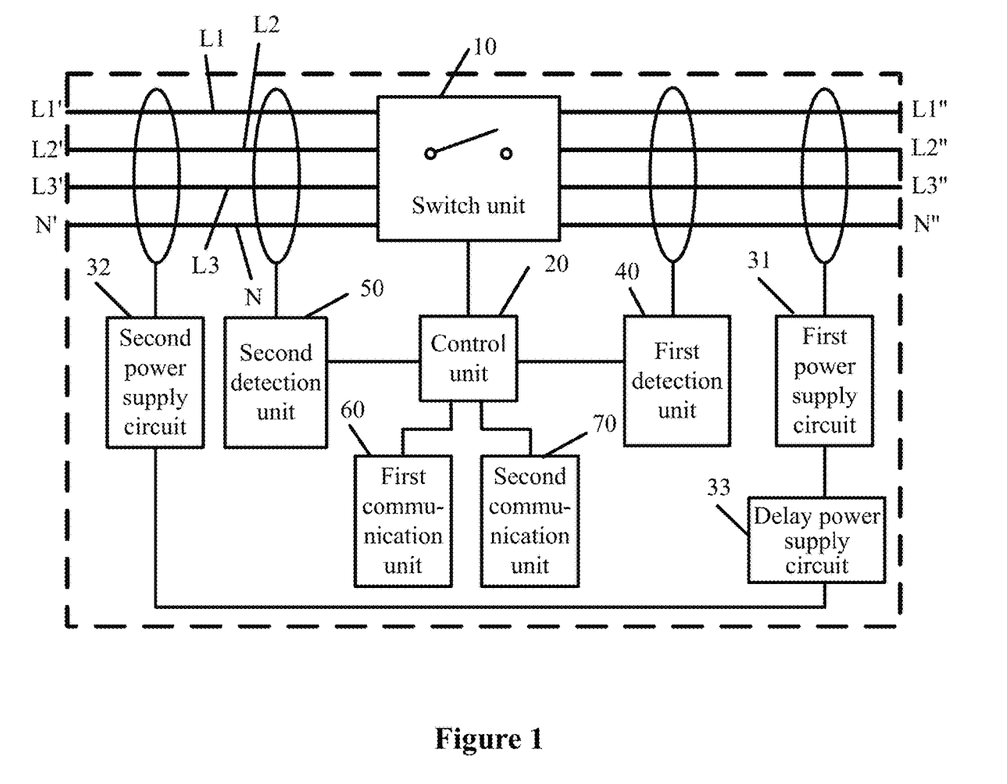
FIG. 1 is a schematic diagram of an intelligent switch device according to an embodiment of the present disclosure.

As shown in FIG. 1, the intelligent switch device includes a first power port, a second power port, a switch unit 10 and a control unit 20.

A first end of the switch unit 10 is connected to a first power supply via the first power port. Specifically, the first end of the switch unit 10 is connected to an inner side of the first power port, and an outer side of the first power port is connected to the first power supply.

A second end of the switch unit 10 is connected to a second power supply via the second power port. Specifically, the second end of the switch unit 10 is connected to an inner side of the second power port, and an outer side of the second power port is connected to the second power supply.

That is, in a case that the switch unit 10 is turned on, the first power supply is connected to the second power supply. When the switch unit 10 is turned off, the first power supply is disconnected from the second power supply.

It should be noted that the intelligent switch device is applicable to a three-phase alternating current power generation system. In this case, the switch unit 10 includes at least three switches. As shown in FIG. 1, live wires L1, L2 and L3 each are provided with at least one switch, so that the switch unit 10 cuts off the three live wires separately. In laws and regulations of some countries, it is further required to cut off a neutral wire N, that is, the neutral wire N is further provided with a switch. In this case, the switch unit 10 includes at least four switches. Moreover, the intelligent switch device is applicable to a single-phase alternating current power generation system and a direct current power generation system. Those skilled in the art should clearly understand connection manners of the intelligent switch device in the single-phase alternating current power generation system and the direct current power generation system, which are not described in detail herein, and fall within the protection scope of the present disclosure.

Here, the intelligent switch device is described by taking FIG. 1 as an example. The first power port of the intelligent switch device including ports L1", L2", L3" and N" is connected to the first power supply, for example, a power grid. The second power port of the intelligent switch device including ports L1', L2', L3' and N' is connected to the second power supply, for example, an inverter, specifically an alternating current side of the inverter.

The control unit 20 is configured to control the switch unit 10 to remain turned on for a first time period when the first power supply is detected as being in abnormal operation, where abnormal operation is capable of causing the switch unit 10 to be tripped. For example, the switch unit 10 is tripped when islanding or fault ride-through occurs in the first power supply. Further, the switch unit 10 is tripped rapidly. Therefore, a device has no sufficient time period to perform detection and control, which is difficult to meet the time period requirements on the grid fault ride-through of and islanding isolation in some regions. In the embodiment, when the first power supply is in abnormal operation as described above, the control unit 20 controls the switch unit 10 to remain turned on for the first time period, so that the switch unit 10 cannot be tripped even if the abnormal operation occurs.

In addition, the first time period is greater than or equal to a time period required for the device to respond to the abnormal operation. That is, the first time period may be the time period required for the device to respond to the abnormal operation. Alternatively, the first time period may be longer than the time period required for the device to respond to the abnormal operation. For example, the first time period is 3 s. A specific value of the first time period is not limited herein but depends on the actual situation, and falls within the protection scope of the present disclosure.

The abnormal operation includes the fault ride-through and the islanding. The fault ride-through requires a second time period. A time period for islanding detection and control for stopping output is a third time period. The second time period and the third time period each are less than or equal to the first time period. It should be noted that the fault ride-through is that in a case that the first power supply is connected to the second power supply via the intelligent switch device, the second power supply maintains the output without protection shutdown when the first power supply has a sudden voltage drop, a sudden voltage rise, a sudden frequency drop or a sudden frequency rise for a short time period. Therefore, the fault ride-through is always performed by the second power supply.

The control unit 20, or the second power supply responds to the abnormal operation. That is, the first time period is greater than or equal to a time period required for the control unit 20 to respond to the abnormal operation, so that the control unit 20 responds to the abnormal operation. For example, the time period for the second power supply to perform the fault ride-through and the time period for the control unit 20 to perform islanding detection and control for stopping output each are less than or equal to the first time period. Alternatively, the first time period is greater than or equal to a time period required for the second power supply to respond to the abnormal operation, so that the second power supply responds to the abnormal operation. For example, the time period for the second power supply to perform the fault ride-through time and the time period for the second power supply to perform islanding detection and control for stopping output each are less than or equal to the first time period. It should be noted that both the second power supply and the control unit 20 respond to the abnormal operation, or one of the second power supply and the control unit 20 responds to the abnormal operation, which are not limited herein but depend on the actual situation, and fall within the protection scope of the present disclosure. In the case that both the second power supply and the control unit 20 respond to the abnormal operation, the first time period is greater than or equal to a time period required for the second power supply to respond to the abnormal operation or a time period required for the control unit 20 to respond to the abnormal operation. Alternatively, the first time period is greater than or equal to a time period for the second power supply to respond to the abnormal operation and the time period required for the control unit 20 to respond to the abnormal operation, which are not limited herein but depend on the actual situation and fall within the protection scope of the present disclosure.

According to the above solution, the device has sufficient time period to operate in respond to the abnormal operation, so that the device meets the time period requirements in case of the abnormal operation of the first power supply, such as the grid fault ride-through and the islanding isolation, thereby improving the safety of a power generation system including the intelligent switch device.

In practices, as shown in FIG. 1, the intelligent switch device further includes a delay power supply unit (for example, including 31, 32, and 33 shown in FIG. 1).

The delay power supply unit is configured to acquire power from the first power supply to supply power to the control unit 20 and the switch unit 10; or supply power to the control unit 20 and the switch unit 10 with a delay when the first power supply is in abnormal operation.

Specifically, the delay power supply unit supplies power to the control unit 20 via a power supply port and supplies power to the switch unit 10 via another power supply port. Alternatively, the delay power supply unit supplies power to the control unit 20 and the switch unit 10 via a same power supply port. The power supply manners of the delay power supply unit for the control unit 20 and the switch unit 10 are not limited herein, which depend on the actual situation and fall within the protection scope of the present disclosure.

It should be noted that when the first power supply is in abnormal operation, the power supply manners of the delay power supply unit for the control unit 20 and the switch unit 10 are more than one, two of which are described below.

In a case, the delay power supply unit includes a delay power supply circuit 33, a first power supply circuit 31 and a second power supply circuit 32. The first power supply circuit 31 is configured to acquire power from the first power supply to supply power to the delay power supply circuit 33. The second power supply circuit 32 is configured to acquire power from the second power supply to supply power to the delay power supply circuit 33 when the first power supply is in abnormal operation. The delay power supply circuit 33 is configured to supply power to the control unit 20 and the switch unit 10, so that the delay power supply unit supplies power to the switch unit 10 and the control unit 20 for the first time period based on the second power supply when the first power supply is in abnormal operation.

That is, in a case that the first power supply operates normally, the first power supply circuit 31 acquires power from the first power supply, so that the delay power supply circuit 33 supplies power to the control unit 20 and the switch unit 10. When the first power supply operates abnormally, the second power supply circuit 32 acquires power from the second power supply, so that the delay power supply circuit 33 supplies power to the control unit 20 and the switch unit 10.

It should be noted that at least one of the first power supply circuit and the second power supply circuit acquires power in an isolation manner. That is, when the first power supply is powered off, the first power supply circuit 31 is isolated from the second power supply circuit 32. For example, one of the first power supply circuit 31 and the second power supply circuit 32 is isolated from another by a transformer, or a relay, to prevent the second power supply from electrifying the first power supply through the first power supply circuit 31 and the second power supply circuit 32, thereby ensuring safety of maintenance personnel for examining and repairing the first power supply.

In another case, the delay power supply unit includes a delay power supply circuit 33, a first power supply circuit 31 and a power storage device for storing power (which is not shown in the drawings). The power storage device is an electrolytic capacitor, a super capacitor, a storage battery or the like. The first power supply circuit 31 is configured to acquire power from the first power supply to supply power to the delay power supply circuit 33. The power storage device is configured to supply power stored in the power storage to the delay power supply circuit 33 when the first power supply is in abnormal operation. The delay power supply circuit 33 is configured to supply power to the control unit 20 and the switch unit 10, so that the delay power supply unit supplies power to the control unit 20 and the switch unit 10 based on the power storage when the first power supply is in abnormal operation.

That is, in the case that the first power supply operates normally, the first power supply circuit 31 acquires power from the first power supply, so that the delay power supply circuit 33 supplies power to the control unit 20 and the switch unit 10. When the first power supply operates abnormally, the delay power supply circuit 33 supplies power to the control unit 20 and the switch unit 10 based on the power stored in the power storage device.

In an embodiment, in the case that the first power supply operates normally, the power storage device acquires power from the first power supply and store the acquired power. In another embodiment, the power storage device stores the power in other manners, which are not limited herein but depends on the actual situation and fall within the protection scope of the present disclosure.

In practices, when the first power supply operates normally, an additional power supply supplies power to the delay power supply circuit 33, which is not described in detail herein. The solutions in which the device has sufficient time period to respond to abnormal operation, such as the fault ride-through and islanding isolation, fall within the protection scope of the present disclosure.

In any one of the above embodiments, each switch in the switch unit 10 is a normally-open switch, also known as a NO switch.

That is, the switch in the switch unit 10 is controlled by the control unit 20 in a case that the switch is powered on. The switch unit 10 automatically turns off when the switch in the switch unit 10 is powered off. With the NO switch, the power generation system can achieve high safety performance. In an aspect, when the first power supply operates abnormally, maintenance personnel may examine and repair the first power supply, for example, power grid maintenance personnel examine and repair the power grid. In this aspect, the switch unit 10 is turned off immediately after the first time period due to the loss of power supply, to prevent electric shock on the maintenance personnel. In another aspect, when the first power supply returns to normal operation, the switch in the switch unit 10 is controlled by the control unit 20 rather than turned on immediately. That is, the control unit 20 is further configured to control the switch unit 10 to be turned on or turned state when the switch unit 10 is powered on. Specifically, the control unit 20 controls the switch unit 10 to be turned on only at a proper time instant, to avoid an energy shock accident resulted from that the first power supply is directly connected to the second power supply.

In practices, as shown in FIG. 1, the intelligent switch device further includes a first detection unit 40 sharing a power supply with the control unit 20. That is, the first detection unit 40 is powered by the delay power supply unit. The process that the delay power supply unit supplies power to the first detection unit 40 is similar to the process that the delay power supply unit supplies power to the control unit 20, and thus is not described herein and falls within the protection scope of the present disclosure.

The first detection unit 40 is configured to detect an electrical parameter of the first power supply and transmit the electrical parameter to the control unit 20, as a control basis for the control unit 20 to control the switch unit 10 to operate.

The electrical parameter includes at least one of a voltage, a current, a frequency, a phase and power. The electrical parameter is not described in detail herein, which depends on the actual situation and falls within the protection scope of the present disclosure.

The control unit 20 controls the switch unit 10 to be turned off by: determining whether the electrical parameter indicates that the first power supply operates abnormally, and controlling the switch unit 10 to be turned off when determining that the electrical parameter indicates the first power supply operates abnormally.

Abnormal operation of the first power supply includes islanding.

In an embodiment, the first power supply is a power grid. When a voltage of the power grid is detected to be close to zero, or a frequency of the power grid changes significantly, the power grid is determined as operating abnormally, for example, the islanding occurs in the power grid. In this case, the control unit 20 controls the switch unit 10 to be turned off. In addition, the second power supply is controlled to switch to a voltage source output mode to supply power to a local load, so that the load operates reliably.

That is, the control unit 20 controls the switch unit 10 to be turned off for the first time period when the first power supply is in abnormal operation if it is determined that the electrical parameter indicates the first power supply operation state operates abnormally. That is, for the first time period, the control unit 20 controls the switch unit 10 to be turned off when determining that the first power supply is in abnormal operation, for example, islanding. When determining that the first power supply operates normally, for example, no islanding, the control unit 20 controls the switch unit 10 to remain turned on until the end of the first time period. Therefore, for the first time period, a signal that the control unit 20 controls the switch unit 10 to be turned off has a higher priority than a signal that controls the switch unit 10 to remain turned on.

It should be noted that the first detection unit 40 is capable of detecting fault ride-through.

Specifically, the control unit 20 determines whether the electrical parameter indicates that the fault ride-through occurs in the first power supply based on the received electrical parameter, and controls the switch unit 10 to remain turned on until the end of the first time period when determining that the electrical parameter indicates that the fault ride-through occurs in the first power supply. That is, the control unit 20 responds to the fault ride-through; and/or, determines whether the electrical parameter indicates that the islanding occurs in the first power supply, and controls the switch unit 10 to be turned off when determining that the electrical parameter indicates that the islanding occurs in the first power supply. That is, the control unit 20 responds to the islanding, thereby detecting islanding and controlling to stop output.

The fault ride-through described above is that in a case that the first power supply is connected to the second power supply via the intelligent switch device, the second power supply maintains the output without protection shutdown when the first power supply has a sudden voltage drop, a sudden voltage rise, a sudden frequency drop or a sudden frequency rise for a second time period. The second time period may be 0.1 s. That is, it is unnecessary to control the switch unit 10 to be turned off due to short duration of the fault ride-through, to avoid reduction of a service life of the switch unit caused by frequent operation of the switch unit, without affecting operation efficiency and a service life of a device including the switch unit due to frequent operation.

The islanding detection is that in a case that the first power supply is connected to the second power supply via the intelligent switch device, when the first power supply is powered off, the control unit 20 detects that the first power supply is powered off in the third time period (for example, 1 s) and controls the switch unit 10 to be turned off.

The first time period is greater than or equal to the second time period, and is greater than or equal to the third time period, so that the control unit 20 has sufficient time period to perform the fault ride-through and islanding detection when the first power supply operates abnormally or is powered off.

The control unit 20 is further configured to detect other abnormal operation of the first power supply and perform protection shutdown accordingly. For example, when the control unit 20 detects that for the first power supply, a voltage is too high/too low, a frequency is too high/too low, a current is too large, a leakage current is too large, a direct current component is too large, a total harmonic distortion (THD) of a voltage is too large, a THD of the current is too large, and voltage unbalance is too large, the control unit 20 controls the switch unit 10 to be turned off.

In practices, the intelligent switch device further includes a second detection unit 50 sharing a power supply with the control unit 20. The second detection unit 50 is configured to detect an output parameter of the second power supply, and transmit the output parameter to the control unit 20. The output parameter of the second power supply includes at least one of a voltage, a current, a frequency, a phase and power. The output parameter is not described in detail herein but depends on the actual situation, and falls within the protection scope of the present disclosure.

The control unit 20 controls the switch unit 10 to be turned on by: comparing the electrical parameter of the first power supply with the output parameter of the second power supply to obtain a comparison result, and controlling the switch unit 10 to be turned on, in a case that the comparison result indicates that the first power supply and the second power supply are allowed to be connected for operation.

In practices, as shown in FIG. 1, the intelligent switch device further includes a first communication unit 60. The control unit 20 communicates with the second power supply via the first communication unit 60.

The first communication unit 60 performs communication by wired communication, such as RS485, CAN and Ethernet. Alternatively, the first communication unit 60 performs communication by wireless communication, such as Wi-Fi, Bluetooth and radio frequency (RF). The first communication unit 60 may perform communication by power line carrier communication, which is only an example. The first communication unit 60 may communicate in other manners, which are not described in detail herein. Further, the first communication unit 60 may communicate in combination with the above communication mode, which depends on the actual situation and falls within the protection scope of the present disclosure.

The first communication unit 60 communicates with the second power supply as follows. The first communication unit 60 transmits the received electrical parameter of the first power supply to the second power supply, receives a first control signal transmitted by the second power supply, and transmits the first control signal to the control unit 20.

The control unit 20 is further configured to perform control in response to the first control signal. Specifically, the control unit 20 controls the switch unit 10 to be turned on when the first control signal indicates turned-on operation. The control unit 20 controls the switch unit 10 to be turned off when the first control signal indicates turned-off operation. The first control signal is not limited herein but depends on the actual situation, and falls within the protection scope of the present disclosure.

In another embodiment, the first communication unit 60 communicates with the second power supply as follows. The first communication unit 60 receives a second control signal transmitted by the control unit 20, and transmits the second control signal to the second power supply. The first communication unit 60 further receives operation data transmitted by the second power supply, and transmits the operation data to the control unit 20.

The control unit 20 is further configured to transmit the second control signal to the first communication unit 60 when an operation state of the switch unit 10 switches, so that an operation state of the second power supply matches the operation state of the switch unit 10.

In practices, in a case that the switch unit 10 is controlled to be turned on, the second control signal includes at least one of: starting the second power supply and changing an output mode of the second power supply, for example, to an output mode other than a voltage source output mode. In a case that the switch unit 10 is controlled to be turned off, the second control signal includes at least one of: stopping the output of the second power supply and changing the output mode of the second power supply, for example, the voltage source output mode. In another embodiment, the second control signal includes a detection result indicating whether a voltage amplitude of the first power supply synchronizes with a synchronizes of the second power supply, whether a frequency of the first power supply synchronizes with a frequency of the second power supply, or whether a phase of the first power supply synchronizes with a phase of the second power supply. In this case, on receipt of the detection result, the second power supply determines, based on the detection result, whether to switch an operation state or the output mode of the second power supply. If the detection result indicates synchronization, the second power supply stops operating, or the output mode of the second power supply is switched to the voltage source output mode. If the detection result indicates non-synchronization, the second power supply starts operating, or the second power supply switches to an output mode other than the voltage source output mode.

As shown in FIG. 1, the intelligent switch device further includes a second communication unit 70. The second communication unit 70 is configured to communicate with a host computer, and receive an instruction, such as, data query, parameter setting, upgrading, and operation control from the host computer. In an embodiment, the host computer is a mobile handheld device (such as a mobile phone with a specific APP and a tablet computer with a specific APP), a local server, a communication host, a remote cloud server and the like, which are not described in detail herein and fall within the protection scope of the present disclosure.

In any one of the above embodiments, the control unit 20 is further configured to control the switch unit 10 to be turned off when power of the switch unit 10 is greater than a power threshold. That is, the intelligent switch device is capable of being tripping responding to too large power, so as to meet requirements of some scenarios.

Specifically, when power transmitted from the first power port to the second power port is greater than a first threshold, or power transmitted from the second power port to the first power port is greater than a second threshold, the control unit 20 controls the switch unit 10 to be turned off to disconnect the first power port from the second power port.

In an embodiment, the first power supply is a diesel generator, which cannot receive reverse power, that is, the power transmitted from the second power port to the first power port. Therefore, for the intelligent switch device, a power threshold corresponding to the power transmitted from the second power port to the first power port is set to zero. That is, the second threshold is zero. When the power is greater than zero, the switch unit 10 is immediately turned off to protect the diesel generator. In another embodiment, the first power supply is a power grid. A power threshold corresponding to the power transmitted from the first power port to the second power port is set to an upper power threshold of a local load in order to reduce power consumption by the local load. That is, the first threshold is the upper power threshold of the local load, for example, 5 KW. When the power is greater than 5 kW, the switch unit 10 is immediately turned off to reduce the power consumption of the power grid.

It should be noted that the first threshold and the second threshold may be equal to or different from each other. The first threshold and the second threshold are not limited herein but depend on the actual situation, and fall within the protection scope of the present disclosure.

In any one of the above embodiments, the intelligent switch device further includes a power meter. The power meter is communicatively connected to at least one of the second power supply and the host computer.

In a case that the switch unit 10 is turned on, power meter the power meter measures forward or reverse power and transmits measured power to the second power supply or the host computer.

The switch unit 10 includes the power meter so that an additional metering device is unnecessary, thereby reducing cost of the intelligent switch device.

In any one of the above embodiments, the intelligent switch device further includes a plastic shell.

An operation handle of the switch unit 10 is arranged outside the plastic shell, so that the switch unit 10 is controlled manually.

In the embodiment, a switch unit and a power meter integrated in a plastic shell are arranged in the intelligent switch device. Further, the intelligent switch device is capable of electricity leakage protection, so that the devices in the intelligent switch device are highly integrated, thereby greatly simplifying a structure of the power generation system and greatly reducing cost compared with an external energy management system (EMS).

A power generation system is further provided according to an embodiment of the present disclosure. As show in FIG. 2, the power generation system includes a first power supply 03, one or more second power supplies 01 and the intelligent switch device 02 according to any one of the embodiments described above. For a structure and operation principle of the intelligent switch device 02, reference is made to description of the embodiment described above, which are not repeated herein.

Figure 2:
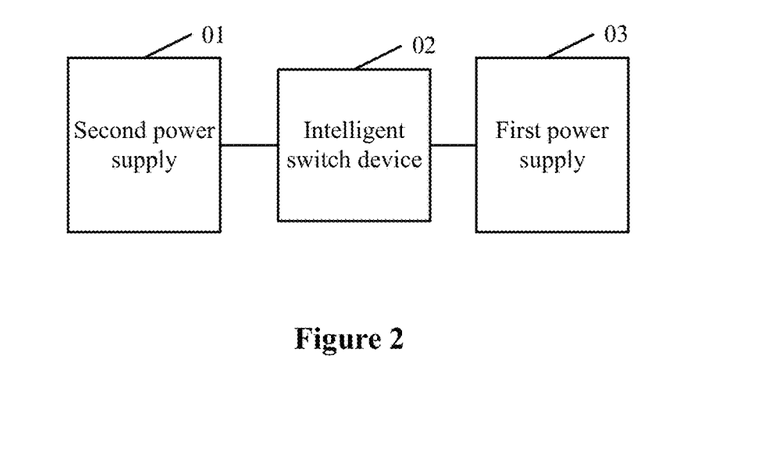
FIG. 2 is a schematic diagram of a power generation system according to an embodiment of the present disclosure.

A first output port of the second power supply 01 and the first power supply 03 are connected to the intelligent switch device 02.

In the above embodiment, the first power supply 03 is a power supply with a voltage source output mode, such as a power grid, a diesel generator with the voltage source output mode and a synchronous generator. An output voltage of the power supply with the voltage source output mode is relatively stable, and fluctuates slightly when a load current changes.

The second power supply 01 is a power supply capable of switching between the voltage source output mode and another output mode other than voltage source output mode. The output mode other than the voltage source output mode includes a current source output mode, a power source output mode and the like. An output current of a power supply in the current source output mode is relatively stable, and fluctuates slightly when an output voltage changes. An output power of the power source in the power source output mode is relatively stable, and an output current of the power source in the power source output mode inversely changes with the output voltage.

It should be noted that each of the voltage source output mode and the non-voltage source output mode refers to a main output mode. For example, a generator operating in a V/F control (that is, voltage frequency control) mode is determined as operating in the voltage source output mode. A PQ control (that is, active and reactive power control) mode refers to a non-voltage source output mode. For a droop control mode and a virtual synchronous machine control mode, the voltage source output mode is a main output mode in some cases and the other output mode is a main output mode in other cases.

Specifically, in a case that the intelligent switch device 02 is turned on, all second power supplies 01 operate in an output mode other than the voltage source output mode. In a case that the intelligent switch device 02 is turned off, at least one second power supply 01 operates in the voltage source output mode, and other second power supply 01 operates in an output mode other than the voltage source output mode, which are not limited herein but depend on the actual situation, and fall within the protection scope of the present disclosure.

Figure 3:
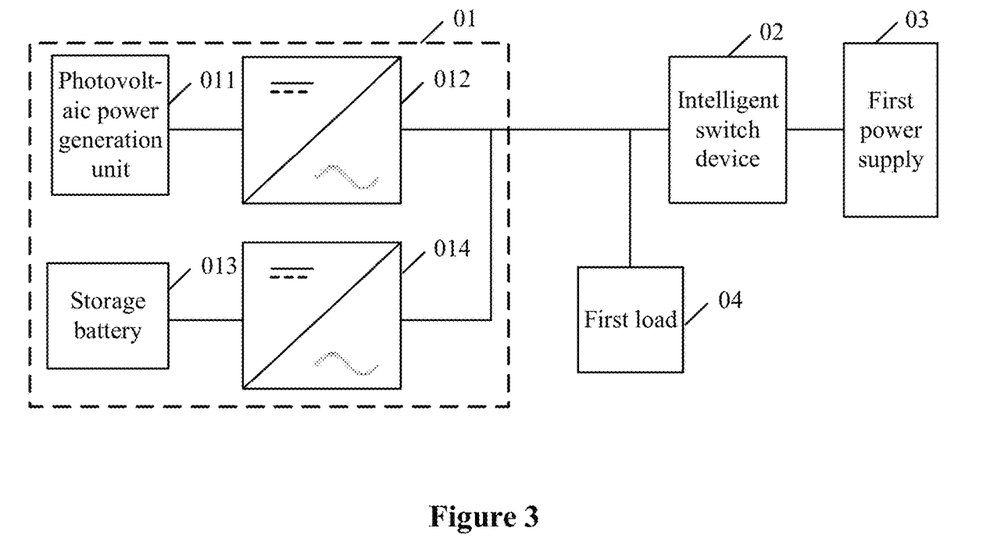
FIG. 3 is a schematic diagram of a power generation system according to another embodiment of the present disclosure.
Figure 4:
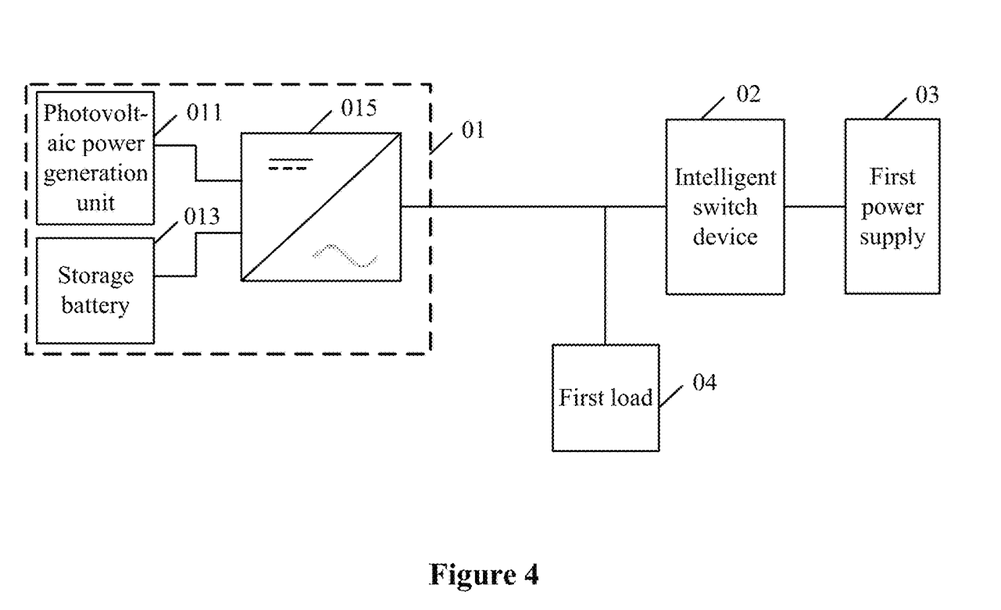
FIG. 4 is a schematic diagram of a power generation system according to another embodiment of the present disclosure.
Figure 5:
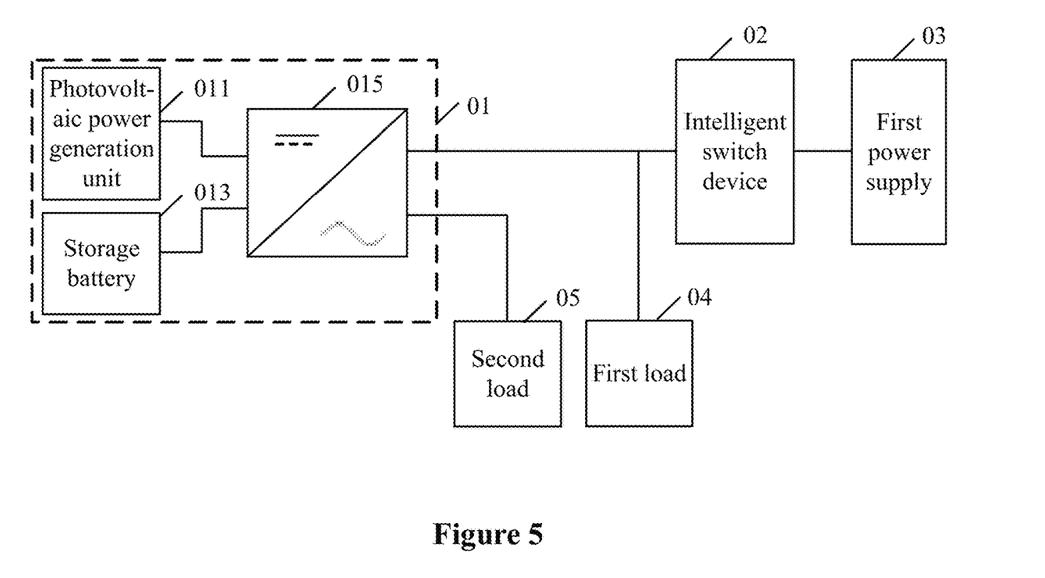
FIG. 5 is a schematic diagram of a power generation system according to another embodiment of the present disclosure.

In practices, as shown in FIGS. 3 to 5, a first load 04 is further arranged between the first output port of the second power supply 01 and the intelligent switch device 02.

In addition, in order to prevent the power generation system from being unstable when the operation state of the intelligent switch device 02 switches, the second power supply 01 is further provided with an independent output port to connect an important load. Specifically, as shown in FIG. 5, a second output port of the second power supply 01 is connected to a second load 05. A priority of power consumption of the second load 05 is higher than a priority of power consumption of the first load 04. When the operation state of the intelligent switch device 02 switches, the first output port of the intelligent switch device 02 connected to the second power supply 01 stops outputting power temporarily and the second output port connected to the second load 05 still outputs power.

In any one of the above embodiments, in the case that the intelligent switch device 02 includes the first communication unit, the second power supply 01 and the intelligent switch device 02 are controlled in a master-slave control manner.

(1) In a case that the second power supply 01 is a master and the intelligent switch device 02 is a slave, when detecting abnormal operation, the second power supply 01 transmits a first control signal to the intelligent switch device 02, so that the intelligent switch device 02 is turned off.

The abnormal operation includes at least islanding. That is, the first power supply 01 is capable of detecting islanding detection and stopping output, That is, in a case that the first power supply 03 is connected to the second power supply 01 via the intelligent switch device 02, when the first power supply 03 is powered off completely, a time period for the second power supply 01 to detect that the first power supply is powered off and shut down is a fourth time period. The intelligent switch device 02 remains turned on without being tripped for a first time period since the islanding occurs in the second power supply 01. The first time period is greater than or equal to the fourth time period, so that the second power supply 01 has sufficient time period to detect islanding and stop output since islanding occurs in the first power supply 03.

The second power supply 01 interacts with the intelligent switch device 02 by performing the following steps 1 to 5.

In step 1, the second power supply 01 transmits a query signal to the intelligent switch device 02 regularly.

In a case that the intelligent switch device 02 is powered by only the first power supply 03, the intelligent switch device 02 is powered off when the first power supply 03 is powered off for a time period. The second power supply 01 regularly transmits the query signal to query an operation state of the intelligent switch device 02 until the first power supply 03 is powered on. In this case, the intelligent switch device 02 is also powered on.

In step 2, on receipt of the query signal, the intelligent switch device 02 transmits a received electrical parameter of the first power supply 03 and an operation state of the switch unit in the intelligent switch device 02 to the second power supply 01.

When being powered off, the intelligent switch device 02 cannot respond to the signal from the second power supply 01. When being powered on, the intelligent switch device 02 responds to the signal from the second power supply 01.

In step 3, the second power supply 01 receives the queried electrical parameter of the first power supply 03, and determines, based on the queried electrical parameter of the first power supply 03, whether that the first power supply 03 is abnormal operation. When determining that the first power supply 03 is in abnormal operation, the second power supply 01 transmits the first control signal to the intelligent switch device 02, so that the intelligent switch device 02 is turned off.

The first control signal may indicate that the intelligent switch device 02 is turned off, and indicate that the intelligent switch device 02 is turned on. Moreover, if it is determined that the first power supply 03 operates abnormally, the first control signal indicates that the intelligent switch device 02 is turned off. In other cases, the first control signal may indicate that the intelligent switch device 02 is turned on, which is not limited herein but depends on the actual situation, and falls within the protection scope of the present disclosure.

It should be noted that, when the second power supply 01 determines to turn on the intelligent switch device 02, the second power supply 01 first stops output from itself, and then transmits the first control signal indicating that the intelligent switch device 02 is turned on to the intelligent switch device 02, to avoid a large impulse current when turning on the intelligent switch device 02 resulted from that an output of the second power supply 01 inconsistent with an output of the first power supply 03. In particular, in a case that the first power supply 03 is a power grid and the second power supply 01 is an inverter, the second power supply 01 further acquires a voltage amplitude, a phase, a frequency and the like of the first power supply 03 detected by the intelligent switch device 02 before determining to turn on the switch unit of the intelligent switch device 02. Then, the second power supply 01 adjusts a voltage amplitude, a phase, a frequency and other states outputted by itself to change with the voltage amplitude, the phase, the frequency and other states of the first power supply 03, and then transmits the first control signal indicating that the intelligent switch device 02 is turned on to the intelligent switch device 02, so that the local load is not powered off during the switching process, thereby achieving seamless switching.

In step 4, on receipt of the first control signal, the intelligent switch device 02 performs an operation in response to the first control signal.

In step 5, in the case that the intelligent switch device 02 is turned off, the second power supply 01 is switched from an output mode other than the voltage source output mode to the voltage source output mode, to supply power to the local load.

(2) In a case that the intelligent switch device 02 is a host and the second power supply 01 is a slave, when detecting abnormal operation that causes the switch unit 10 of the intelligent switch device 02 to be tripped, the intelligent switch device 02 transmits a second control signal to the second power supply 01, so that the second power supply 01 operates normally or stops operating.

Specifically, the second power supply 01 interacts with the intelligent switch device 02 by performing the following steps 1 to 5.

In step 1, the intelligent switch device 02 monitors an electrical parameter of the first power supply 03, or transmits a third control signal to the second power supply 01, to query an operation state of the first power supply 03.

On receipt of the third control signal, the second power supply 01 detects the electrical parameter of the first power supply 03.

In step 2, the intelligent switch device 02 determines whether a power generation system including the intelligent switch device 02 has an operation condition in which the first power supply 03 is connected in parallel with the second power supply 01. For example, it is determined whether abnormal operation causing the switch unit to be tripped occurs in the first power supply 03. The abnormal operation includes an abnormal operation, and the fault ride-through. If it is determined that the power generation system has no operation condition in which the first power supply 03 is connected in parallel with the second power supply 01, the intelligent switch device 02 controls the switch unit of the intelligent switch device 02 to be turned off, and then transmits the second control signal to the second power supply 01.

The second control signal may be a signal to start the second power supply 01, a signal to stop output of the second power supply 01, a signal to switch to a voltage source output mode, or a signal to switch to an output mode other than the voltage source output mode. However, when it is determined that the first power supply 03 is in abnormal operation, the second control signal is a signal to switch to the voltage source output mode. In other cases, the second control signal is not limited herein but depends on the actual situation, and falls within the protection scope of the present disclosure.

In step 3, on recipe of the second control signal, the second power supply 01 switches to the voltage source output mode, to supply power to the local load.

In step 4, when the first power supply 03 returns to normal operation, the intelligent switch device 02 transmits the second control signal to the second power supply 01 to stop the second power supply 01, and then controls the switch unit of itself to be turned on, so that the first power supply 03 is connected to the second power supply 01. In particular, in a case that the first power supply 03 is the power grid and the second power supply 01 is the inverter, the intelligent switch device 02 further transmits a synchronous signal to the second power supply 01 before turning on the switch unit, so that the second power supply 01 adjusts a voltage amplitude, a phase, a frequency and other states outputted by itself to change with a voltage amplitude, a phase, a frequency and other states outputted by the first power supply 03, and then turns on the switch unit. Therefore, the local load is not powered off during the switching process, thereby achieving seamless switching.

In step 5, the second power supply 01 returns to operate.

It should be noted that in cases (1) and (2), an output power of the first power supply 03 is set to exceed an output power of the second power supply 01, and a flowing capacity of the switch unit is set to exceed the output power of the second power supply 01, so that the first power supply 03 and the second power supply 01 can connected to a local load with an output power exceeding the output power of the second power supply 01 when the switch unit is turned on.

It should be noted that the second power supply 01 is capable of detecting fault ride-through. The fault ride-through is that in a case that the first power supply 03 is connected to the second power supply 01 via the intelligent switch device 02, the second power supply 01 maintains the output without protection shutdown when the first power supply 03 has a sudden voltage drop, a sudden voltage rise, a sudden frequency drop or a sudden frequency rise for a short time period. The fault ride-through lasts for is a second time period, such as, 0.1 s. Since the second time period is short, it is unnecessary to control the switch unit 10 to be turned off due to short duration of the fault ride-through, or even the switch unit of the intelligent switch 02 is controlled to remain turned on. The first time period is greater than the second time period, so that the second power supply 01 has sufficient time period to perform the fault ride-through when the fault ride-through occurs in the first power supply 03.

In other embodiments, the second power supply 01 has other functions, which are not described in detail herein and fall with the protection scope of the present disclosure.

The intelligent switch device 02 is provided according to the embodiment, to meet requirements on switching between grid-connected and grid-disconnected without conflicting with the low voltage ride-through and islanding detection of the second power supply 01, thereby improving the safety of the power generation system.

In any one of the above embodiments, the first power supply 03 is the power grid. The second power supply 01 includes an energy supply unit and a conversion unit.

A direct current side of the conversion unit is directly or indirectly connected to the energy supply unit. An alternate current side of the conversion unit serves as the first output port of the second power supply 01.

The energy supply unit includes at least one of a storage battery, a fuel cell, a photovoltaic power generation unit and a wind power generation unit. The energy supply unit is not limited to the above but further includes, for example, a small water conservancy power generation unit and a flywheel energy storage power generation unit. A type of the energy supply unit depends on the actual situation, which falls within the protection scope of the present disclosure.

A type of the conversion unit varies with application scenarios. Specifically, in a case that the energy supply unit is a direct current device such as the photovoltaic power generation unit, the storage battery and the fuel cell, the conversion unit is the inverter. In a case that the energy supply unit is an alternate current device such as the wind power generation unit, the conversion unit is a converter. The types of the conversion unit and the energy supply unit are not described in detail herein, as long as the conversion unit matches the energy supply unit, which all fall within the protection scope of the present disclosure.

The power generation system is described herein by taking the conversion unit being the inverter as an example.

In a photovoltaic power generation system, a photovoltaic inverter commonly operates based on a maximum power point tracking (MPPT) algorithm, so that output power of the photovoltaic inverter is maximum output power of a photovoltaic array at a current time instant. In this case, the photovoltaic inverter is considered as a constant power source. An output current of the photovoltaic inverter inversely changes with an alternate current voltage to maintain the output power of the photovoltaic inverter to the maximum output power. A distributed generation device such as the photovoltaic inverter further has another common operation mode. In the operation mode, the maximum power output at a grid-connection position is limited, for example, to a fixed proportion of an installed power of the distributed generation device, for example, to 60%, or to 0%, so as to encourage self-sufficiency. In such case, the operation mode of the distributed generation device is mostly a limited-power operation mode, that is, serves as the constant power source.

However, a maximum output current of the photovoltaic inverter is limited by current flowing capacities of a circuit device and a structure device. When the alternate current voltage decreases so that the output current of the photovoltaic inverter increases to an upper threshold, the photovoltaic inverter switches to a current source output mode. In this case, the output current is not increase with the decrease of the alternate current voltage.

In a case that the first power supply 03 is connected to the second power supply 01 via the intelligent switch device 02, the photovoltaic inverter in the second power supply 01 operates in an output mode other than the voltage source output mode. In a case that the intelligent switch device 02 disconnects the first power supply 03 from the second power supply 01, the photovoltaic inverter in the second power supply 01 is connected to the local load to maintain the operation of the local load. In such case, it is required to generate a stable voltage for the operation of the local load, and thus the photovoltaic inverter switches to the voltage source output mode.

An output power of a photovoltaic cell varies with light conditions, resulting in low stability. Therefore, a stable power source is required to make the local load operate reliably. A storage battery and a fuel cell are ideal stable power sources. If an energy supply unit in the second power supply 01 is the storage battery or the fuel cell, that is, the conversion unit is an energy storage inverter, in the case that the first power supply 03 is connected to the second power supply 01 via the intelligent switch device 02, the energy storage inverter operates in an output mode other than the voltage source output mode. In a case that the intelligent switch device 02 disconnects the first power supply 03 form the second power supply 01, the energy storage inverter is connected to the local load to maintain the operation of the local load. In such case, it is required to generate a stable voltage required for operation of the local load. Therefore, the energy storage inverter switches to the voltage source output mode.

The power generation system is described by taking the energy supply unit including the photovoltaic power generation unit and the storage battery as an example.

As shown in FIG. 3, the photovoltaic power generation unit 011 and the storage battery 013 are connected to respective inverters. That is, a photovoltaic inverter 012 and an energy storage inverter 014 are combined to form the second power supply 01. In the case that the first power supply 03 is connected to the second power supply 01 via the intelligent switch device 02, the photovoltaic inverter 012 and the energy storage inverter 014 operate in an output mode other than the voltage source output mode. In a case that the intelligent switch device 02 disconnects the first power supply 03 from the second power supply 01, the energy storage inverter 014 switches to the voltage source output mode, and the photovoltaic inverter 012 still operates in the output mode other than the voltage source output mode. An overall output mode of the energy storage inverter 014 and the photovoltaic inverter 012 is the voltage source output mode.

The energy storage inverter 014 and the photovoltaic inverter 012 may be combined to form a hybrid inverter. As shown in FIGS. 4 and 5, the photovoltaic power generation unit 011 and the storage battery 013 are connected to a hybrid inverter 015. The operation principle and process of the hybrid inverter 015 are similar to that in the above description, and are not described in detail herein, and all fall within the protection scope of the present disclosure.

It should be noted that features described in different embodiments of the present disclosure may be replaced or combined with each other. The same or similar parts among the embodiments can be referred to each other, and each of the embodiments emphasizes the differences from others. Since the system or the embodiments of the system is similar to the method therein, the description thereof is relatively simple, and for relevant matters references may be made to the description of the method. The system and the embodiments of the system described above are only illustrative. Units described as separate components may be or be not physically separated. Components shown as units may be or may be not physical units, that is, may be located in one place or may be distributed to multiple network units. As needed, some or all of the modules may be selected to implement the embodiments of the present disclosure. Those skilled in the art may understand and implement the embodiments of the present disclosure without any creative work.

It is to be further understood by those skilled in the art that units and algorithm steps described in combination with the disclosed embodiments may be implemented by electronic hardware, computer software or a combination thereof. In order to clearly describe interchangeability of the hardware and the software, the units and algorithm steps are generally described above based on functions. Whether the functions are implemented by the hardware or the software is determined by specific applications of the technical solutions and design constraints. For each of the specific applications, those skilled in the art may adopt a specific implementation to realize the functions described above, and the implementation should fall within the scope of the present disclosure.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. An intelligent switch device, comprising a first power port, a second power port, a switch unit and a control unit, wherein
a first end of the switch unit is connected to a first power supply via the first power port;
a second end of the switch unit is connected to a second power supply via the second power port;
the control unit is configured to control the switch unit to remain turned on for a first time period when the first power supply is in abnormal operation, wherein the abnormal operation causes the switch unit to be tripped; and
the first time period is greater than or equal to a time period required for a device to respond to the abnormal operation, wherein the abnormal operation comprises fault ride-through and islanding, and wherein
a time period for the second power supply to perform the fault ride-through is less than or equal to the first time period; and
a time period for the second power supply to detect the islanding and stop output is less than or equal to the first time period, and/or
a time period for the control unit to detect the islanding and control to stop output is less than or equal to the first time period.

2. The intelligent switch device according to claim 1, further comprising:
a delay power supply unit configured to:
acquire power from the first power supply to supply power to the control unit and the switch unit; or
supply power to the control unit and the switch unit with a delay when the first power supply is in the abnormal operation.

3. The intelligent switch device according to claim 2, wherein the delay power supply unit comprises a delay power supply circuit, a first power supply circuit and a second power supply circuit, wherein
the first power supply circuit is configured to acquire power from the first power supply to supply power to the delay power supply circuit;
the second power supply circuit is configured to acquire power from the second power supply to supply power to the delay power supply circuit when the first power supply is in the abnormal operation; and
the delay power supply circuit is configured to supply power to the control unit and the switch unit.

4. The intelligent switch device according to claim 1, wherein
the switch unit is turned off when being powered off; and
the control unit is further configured to control the switch unit to be turned on or turned off when the switch unit is powered on.

5. The intelligent switch device according to claim 4, further comprising a first detection unit, wherein
the first detection unit shares a power supply with the control unit; and
the first detection unit is configured to detect an electrical parameter of the first power supply and transmit the electrical parameter to the control unit for the control unit to control the switch unit.

6. The intelligent switch device according to claim 5, wherein the control unit is configured to control the switch unit to be turned off by:
controlling the switch unit to be turned off if it is determined that the electrical parameter indicates that the first power supply is in the abnormal operation.

7. The intelligent switch device according to claim 5, further comprising a second detection unit, wherein
the second detection unit shares a power supply with the control unit; and
the second detection unit is configured to detect an output parameter of the second power supply and transmit the output parameter to the control unit.

8. The intelligent switch device according to claim 7, wherein the control unit is configured to control the switch unit to be turned on by:
  comparing the electrical parameter of the first power supply with the output parameter of the second power supply to obtain a comparison result; and
  controlling the switch unit to be turned on in a case that the comparison result indicates that the first power supply and the second power supply are allowed to be connected for operation.

9. The intelligent switch device according to claim 5, further comprising:
  a first communication unit configured to communicate with the second power supply, wherein the control unit communicates with the second power supply via the first communication unit.

10. The intelligent switch device according to claim 9, wherein the first communication unit is configured to communicate with the second power supply by:
  transmitting the electrical parameter of the first power supply to the second power supply; and
  receiving a first control signal transmitted by the second power supply, and transmitting the first control signal to the control unit, wherein
  the control unit is further configured to perform operation in response to the first control signal.

11. The intelligent switch device according to claim 9, wherein the first communication unit is configured to communicate with the second power supply by:
  receiving a second control signal transmitted by the control unit, and transmitting the second control signal to the second power supply, wherein
  the control unit is further configured to:
  transmit the second control signal to the first communication unit when an operation state of the switch unit is changed, to control an operation state of the second power supply to match the operation state of the switch unit.

12. The intelligent switch device according to claim 11, wherein
  in a case that the switch unit is controlled to be turned on, the second control signal comprises at least one of starting the second power supply and changing an output mode of the second power supply; and
  in a case that the switch unit is controlled to be turned off, the second control signal comprises at least one of stopping output of the second power supply and changing an output mode of the second power supply.

13. A power generation system, comprising the first power supply, one or more second power supplies and the intelligent switch device according to claim 1, wherein the first power supply and a first output port of the second power supply are connected to the intelligent switch device.

14. The power generation system according to claim 13, wherein
  the intelligent switch device comprises a first communication unit, and the second power supply and the intelligent switch device operate in a master-slave control manner.

15. The power generation system according to claim 14, wherein
  the second power supply is a master and the intelligent switch device is a slave, and when the abnormal operation is detected, the second power supply transmits a first control signal to the intelligent switch device to control the intelligent switch device to be turned off; or
  the intelligent switch device is a master and the second power supply is a slave, and when the abnormal operation is detected, the intelligent switch device transmits a second control signal to the second power supply to control the second power supply to operate normally or stop operating, wherein the abnormal operation causes the switch unit of the intelligent switch device to be tripped.

16. The power generation system according to claim 13, wherein
  the first power supply is capable of operating in a voltage source output mode; and
  the second power supply is capable of switching between the voltage source output mode and an output mode other than the voltage source output mode.

17. The power generation system according to claim 16, wherein
  in a case that the intelligent switch device is turned on, all second power supplies operate in the output mode other than the voltage source output mode; and
  in a case that the intelligent switch device is turned off, at least one second power supply operates in the voltage source output mode, and other second power supply operates in the output mode other than the voltage source output mode.

18. The power generation system according to claim 13, wherein the first power supply is a power grid, and the second power supply comprises an energy supply unit and a conversion unit, wherein
  a direct side of the conversion unit is directly or indirectly connected to the energy supply unit; and
  an alternating current side of the conversion unit serves as the first output port of the second power supply.

* * * * *